(12) United States Patent
Dahle (10) Patent No.: US 10,995,964 B2
(45) Date of Patent: May 4, 2021

(54) WIND GUARD SYSTEM, DEVICE AND METHOD THEREOF

(71) Applicant: North Atlantic Imports, LLC, Logan, UT (US)

(72) Inventor: Roger Dahle, Providence, UT (US)

(73) Assignee: North Atlantic Imports, LLC, Logan, UT (US)

( * ) Notice: Subject to any disclaimer, the term of this patent is extended or adjusted under 35 U.S.C. 154(b) by 299 days.

(21) Appl. No.: 16/171,338

(22) Filed: Oct. 25, 2018

(65) Prior Publication Data

US 2019/0128538 A1     May 2, 2019

Related U.S. Application Data (60) Provisional application No. 62/578,278, filed on Oct. 27, 2017.

(51) Int. Cl.
| | | |
|---|---|---|
| *F24C 15/28* | (2006.01) | |
| *A47J 37/07* | (2006.01) | |
| *A47J 37/06* | (2006.01) | |

(52) U.S. Cl.
CPC ............. *F24C 15/28* (2013.01); *A47J 37/067* (2013.01); *A47J 37/0786* (2013.01)

(58) Field of Classification Search
CPC ....... F24C 15/28; A47J 37/067; A47J 37/0786
See application file for complete search history.

(56) References Cited

U.S. PATENT DOCUMENTS

| | | | |
|---|---|---|---|
| 4,508,096 A | 4/1985 | Slattery | |
| 4,663,517 A | 5/1987 | Huff et al. | |
| 4,726,349 A | 2/1988 | Gehrke | |
| 4,838,446 A | 6/1989 | Ali | |
| 5,495,845 A * | 3/1996 | Hait | F24C 3/14 126/25 R |
| 5,542,347 A | 8/1996 | Joseph | |
| 5,558,008 A | 9/1996 | Jenkins | |
| 5,740,723 A | 4/1998 | Lin | |
| 5,842,463 A * | 12/1998 | Hall | A47J 33/00 126/9 R |
| 5,979,428 A | 11/1999 | Greene, Jr. | |
| 6,125,838 A | 10/2000 | Hedgpeth | |
| D613,117 S * | 4/2010 | Richburg | D7/409 |
| 8,020,546 B1 | 9/2011 | Bourgeois et al. | |
| 8,757,140 B2 * | 6/2014 | Hatjopoulos | A47J 37/0682 126/214 D |
| 2004/0099258 A1 | 5/2004 | Price | |
| 2005/0115556 A1 | 6/2005 | Carson et al. | |
| 2007/0207429 A1 | 9/2007 | Barker | |

(Continued)

*Primary Examiner* — Alfred Basichas
(74) *Attorney, Agent, or Firm* — David L. Stott (57) ABSTRACT

Embodiments of a wind guard system for blocking a crosswind from flowing through a gap defined between a griddle and a cooking station. The wind guard system includes multiple wind guard members each having a shield portion and a hook portion, the hook portion extending from an upper end portion of the shield portion. The hook portion is sized and configured to be positioned to removably hang over a top edge of upstanding walls of the griddle member so that a height of the shield portion extends downward to cover the gap defined between an underside of the griddle member and the upper side of the cooking station to at least partially prevent wind from moving through the gap.

20 Claims, 6 Drawing Sheets

(56) References Cited

U.S. PATENT DOCUMENTS

2009/0038605 A1\* 2/2009 Dahle ................ A47J 37/0704
                                                           126/25 R
2010/0000983 A1   1/2010   Babington
2010/0116149 A1   5/2010   Lai
2018/0220845 A1\*   8/2018   Dahle ................... A47B 37/04

\* cited by examiner

WIND GUARD SYSTEM, DEVICE AND METHOD THEREOF

CROSS-REFERENCE TO RELATED APPLICATIONS

This application claims the benefit of U.S. Provisional Application No. 62/578,278, filed Oct. 27, 2017, the disclosure of which is hereby incorporated by reference in its entirety.

TECHNICAL FIELD

The present invention relates generally to outdoor type cooking stations and, more specifically, the present invention relates to a wind guard system for at least partially blocking cross-wind for griddle type outdoor cooking stations.

BACKGROUND OF THE INVENTION

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame burners. One problem with using a griddle directly on a grill or over flame burners is the control of the temperature of the griddle cooking surface. This is especially true in windy outdoor conditions.

BRIEF SUMMARY OF THE INVENTION

The present invention is directed to various embodiments of a wind guard system for use with an outdoor type griddle cooking station having an upper side with burners positioned therein. In one embodiment, the wind guard system includes a griddle member and multiple wind guard members. The griddle member includes an upper side and an underside, the upper side including a flat rectangular cooking surface and an upstanding wall extending along a periphery of the flat rectangular cooking surface. The upstanding wall extends at least along a rear side, a right side and a left side of the periphery of the flat rectangular cooking surface. The underside of the griddle member includes legs adjacent to an underside periphery of the underside of the griddle member. The legs are sized and configured to be positioned on the upper side of the cooking station so as to define a gap between the underside of the griddle member and the upper side of the cooking station. The multiple wind guard members are separate and discrete from each other, each of the multiple wind guard members extending with an elongated length, a height, and a thickness, the thickness being a sheet metal material. Each of the multiple wind guard members include an upper end portion exhibiting a hook portion, the hook portion of each of the multiple wind guard members sized and configured to be positioned to removably hang over a top edge of the upstanding wall of the griddle member. With this arrangement, each of the multiple wind guard members extends downward to cover the gap defined between the underside of the griddle member and the upper side of the cooking station to at least partially prevent wind from moving through the gap.

In another embodiment, each of the multiple wind guard members includes an elongated hole defined therein, the elongated hole extending along the elongated length of each of the multiple wind guard members. In a further embodiment, the elongated hole exhibits a vent structure. In another embodiment, the hook portion of each of the wind guard members extends along the elongated length of the upper end portion of each of the wind guard members.

In another embodiment, each of the multiple wind guard members includes two wind guard members with a first length and two wind guard members with a second length, the height of each of the wind guard members with the first length and the second length being a common height. In another embodiment, one of the multiple wind guard members positioned over the rear side of the upstanding wall is configured to be positioned adjacent at least one other wind guard member positioned over the rear side of the upstanding wall so that the adjacent wind guard members are positioned in a non-coupled manner relative to each other. In another embodiment, each of the multiple wind guard members includes an opening defined therein, the opening positioned adjacent to one end of each of the wind guard members.

In accordance with another embodiment of the present invention, a method for substantially blocking wind between a gap of a griddle cooking station is provided. The method includes the following steps: providing a cooking station including a base frame having a front wall, a rear wall, a left wall and a right wall each extending to an upper end of the base frame so as to define an upper rectangular periphery of the base frame, the cooking station including flame burners positioned between the front wall and the rear wall, the cooking station including a griddle member sized to correspond with the upper rectangular periphery of the base frame, the griddle member including an upper side and an underside, the upper side including a flat rectangular cooking surface and an upstanding wall extending along a periphery of the flat rectangular cooking surface, the upstanding wall extending at least along a rear side, a right side and a left side of the periphery of the flat rectangular cooking surface, the underside of the griddle member including legs adjacent to an underside periphery of the underside of the griddle member, the legs sized and configured to be positioned on the base frame so as to define a gap between the underside of the griddle member and the upper end of the base frame; and positioning multiple separate and discrete wind guard members with a hook portion such that hook portion of each of the wind guard members sits over a top edge of the upstanding wall of the griddle member so that the wind guard members extend downward to cover the gap between the underside of the griddle member and the upper end of the base frame to at least partially prevent wind from moving through the gap.

In another embodiment, the positioning step includes hanging the wind guard members over the top edge of the upstanding wall of the griddle member. In another embodiment, the positioning step includes hanging the wind guard members with the hook portion that extends along an upper end portion of an elongated length of each of the wind guard members. In another embodiment, the positioning step includes positioning the wind guard members over the top edge of the upstanding wall of the griddle member such that an elongated hole defined in each of the wind guard members extends longitudinally along an elongated length of the wind guard members and extends to correspond with the gap defined between the griddle member and the base frame. In yet another embodiment, the positioning step includes positioning two wind guard members with a first longitudinal length and positioning two wind guard members with a second longitudinal length such that a height of each of the wind guard members with the first and second longitudinal lengths is a common height.

In another embodiment, the positioning step includes positioning wind guard members separately and discretely over the top edge of the upstanding wall of the griddle member such that the wind guard members are positioned in a disconnected manner relative to each other. In another embodiment, the positioning step includes re-positioning the wind guard members to different positions over the top edge of the upstanding wall of the griddle member.

In accordance with another embodiment of the present invention, a wind guard system for blocking a cross-wind while cooking a food product is provided. The wind guard system includes a cooking station, a griddle member, and multiple wind guard members. The cooking station includes a base frame having a front wall, a rear wall, a left wall and a right wall. Each wall extends to an upper end of the base frame so as to define an upper rectangular periphery of the base frame. The cooking station includes flame burners positioned between the front wall and the rear wall. The griddle member is sized to correspond with the upper rectangular periphery of the base frame. The griddle member includes an upper side and an underside, the upper side including a flat rectangular cooking surface and an upstanding wall extending along a periphery of the flat rectangular cooking surface. The upstanding wall extends at least along a rear side, a right side and a left side of the periphery of the flat rectangular cooking surface. The underside of the griddle member includes legs adjacent to an underside periphery of the underside of the griddle member, the legs sized and configured to be positioned on the base frame so as to define a gap between the underside of the griddle member and the upper end of the base frame. The multiple wind guard members are separate and discrete from each other. Each of the multiple wind guard members extend with an elongated length, a height, and a thickness, the thickness being a sheet metal material. Each of the multiple wind guard members includes an upper end portion exhibiting a hook portion. The hook portion of each of the multiple wind guard members are sized and configured to be positioned to removably hang over a top edge of the upstanding wall of the griddle member. With this arrangement, each of the multiple wind guard members extends downward to cover the gap defined between the underside of the griddle member and the upper side of the cooking station to at least partially prevent wind from moving through the gap.

In another embodiment, each of the multiple wind guard members includes an elongated hole defined therein, the elongated hole extending along the elongated length of each of the multiple wind guard members. In a further embodiment, the elongated hole exhibits a vent structure. In another embodiment, the hook portion of each of the wind guard members extends along the elongated length of the upper end portion of each of the wind guard members.

In another embodiment, each of the multiple wind guard members includes two wind guard members with a first length and two wind guard members with a second length, the height of each of the wind guard members with the first length and the second length being a common height. In another embodiment, each of the multiple wind guard members includes an opening defined therein, the opening positioned adjacent to one end of each of the wind guard members.

In accordance with another embodiment of the present invention, a wind guard system for blocking a cross-wind while cooking a food product on a griddle member positioned on a cooking station such that a gap is defined between an upper side of the cooking station and an underside of the griddle member is provided. The wind guard system includes multiple wind guard members separate and discrete from each other. Each of the multiple wind guard members includes an elongated flat structure extending with an elongated length, a height, and a thickness, the thickness being a sheet metal material. The elongated flat structure includes an upper end portion exhibiting a hook portion. The hook portion is sized and configured to be positioned to removably hang over a top edge of the griddle member so that the height of the elongated structure extends downward to cover a gap between an underside of the griddle member and the upper side of the cooking station to at least partially prevent wind from moving through the gap.

In another embodiment, the elongated flat structure includes an elongated hole defined therein, the elongated hole extending along the elongated length of each of the multiple wind guard members. In a further embodiment, the elongated hole exhibits a vent structure. In another embodiment, the hook portion of the elongated structure extends along the elongated length of the upper end portion of each of the wind guard members. In another embodiment, the hook portion includes a j-shaped configuration. In yet another embodiment, the elongated structure includes an opening defined therein, the opening positioned adjacent to one end of each of the wind guard members.

In another embodiment, the elongated flat structure extends to define a bottom end with a bottom extension extending upward from the bottom end along a length of the elongated flat structure. In another embodiment, the elongated flat structure extends between a first end and a second end, the first and second ends including a folded portion. In still another embodiment, the wind guard member comprises a single-piece seamless monolithic structure.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figures 1, 2A:
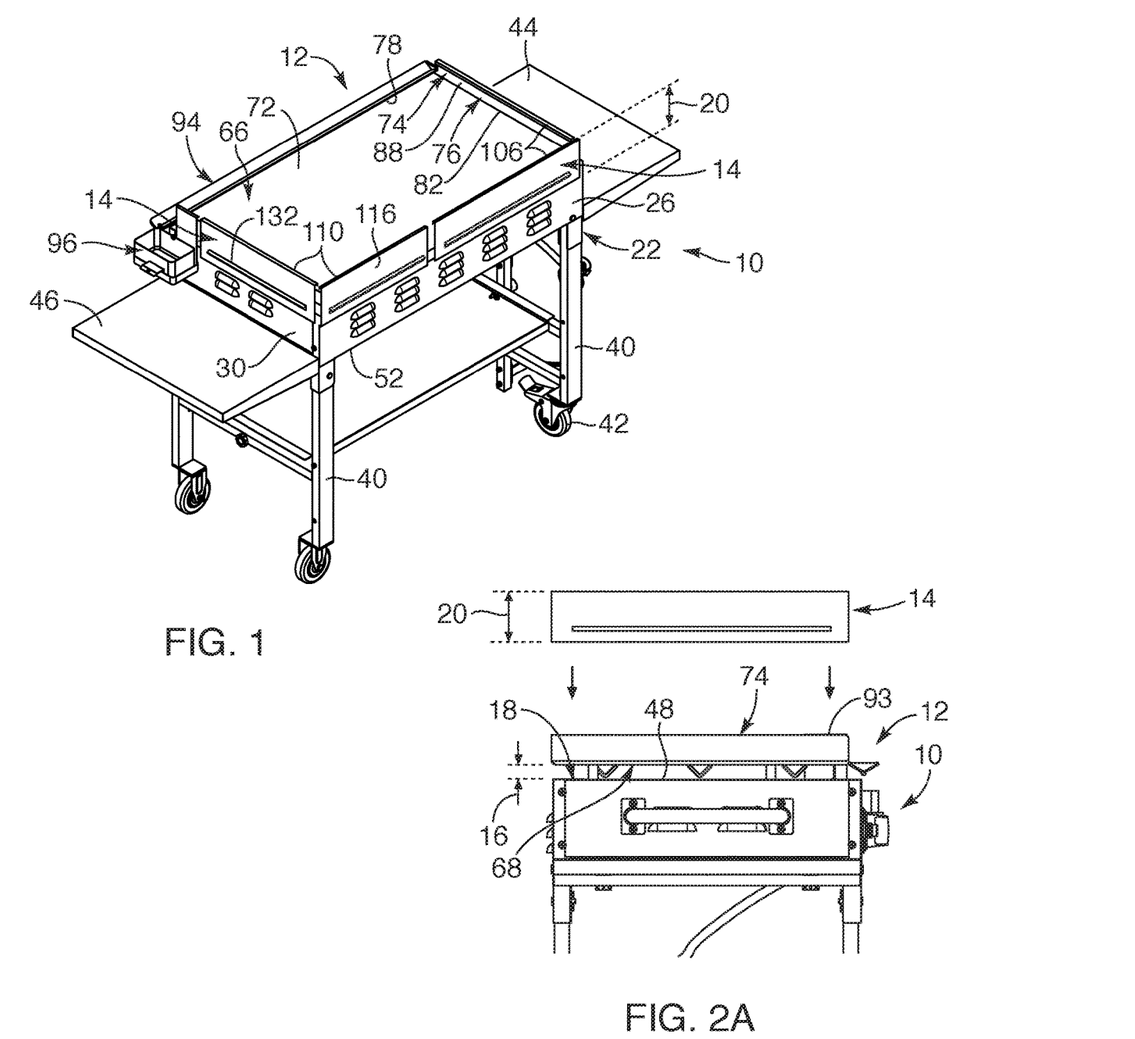
FIG. 1 is a perspective view of a cooking station with a griddle member positioned thereon, depicting wind guard members positioned over the griddle member, according to an embodiment of the present invention.
FIG. 2A is partial side view of the cooking station and the griddle member, depicting a gap between the cooking station and the griddle member with the wind guard member in a non-assembled position, according to another embodiment of the present invention.
Figure 2B:
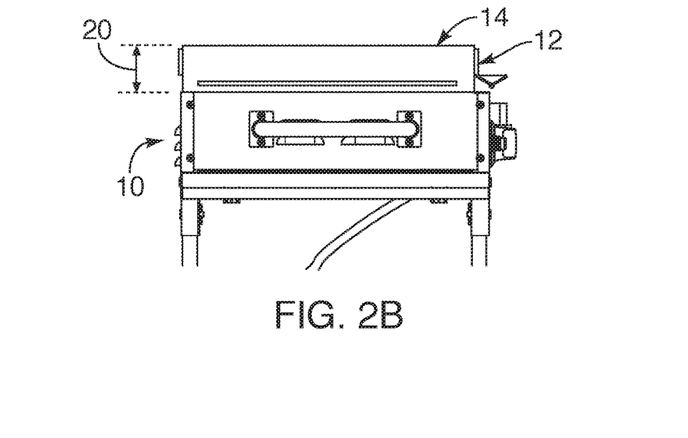
FIG. 2B is a partial side view of the cooking station and the griddle member, depicting the wind guard member positioned over the griddle member to block a portion of the gap between the cooking station and the griddle member, according to another embodiment of the present invention.

Referring to FIGS. 1, 2A, and 2B, a cooking station 10 with a griddle member 12 having multiple wind guard members 14 positioned over different portions of the griddle member 12 is provided. Such wind guard members 14 may be sized and configured to at least partially block a cross-wind from flowing into a gap 16 defined between an upper side 18 of the cooking station 10 and the griddle member 12. As depicted, the wind guard members 14, upon being positioned over the different portions of the griddle member 12, may be sized with a height dimension 20 to extend downward to cover the gap 16. In this manner, the wind guard members 14 or wind guard system may be employed to at least partially block the gap 16 so as to prevent most of any cross-wind from flowing through the gap 16 and, as such, facilitating the burners to more effectively heat the griddle member 12 in windy outdoor conditions.

Figure 3:
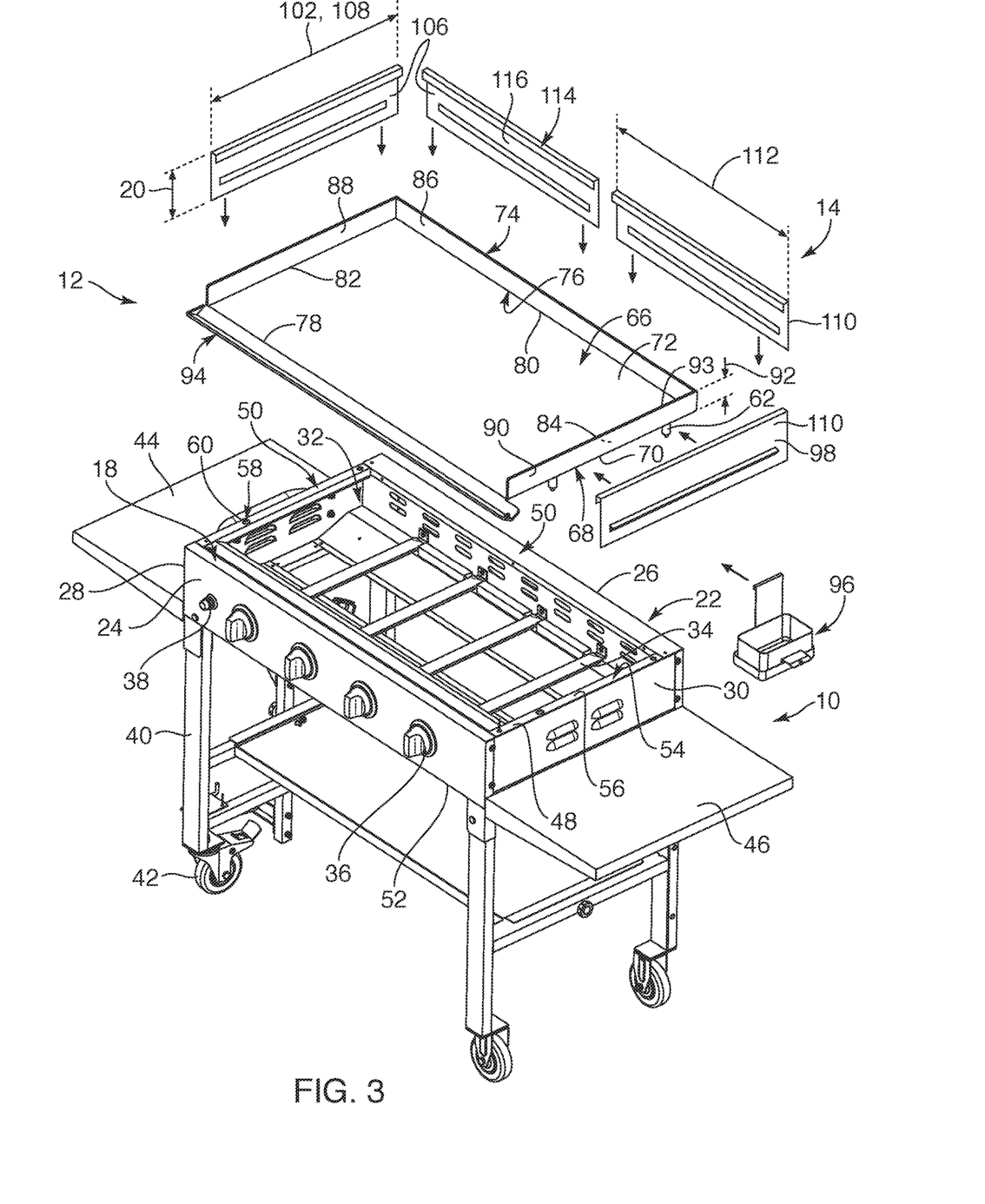
FIG. 3 is an exploded view of the wind guard members, the cooking station, and the griddle member, according to an embodiment of the present invention.

With reference to FIGS. 1 and 3, the cooking station 10 may include a base frame 22 with a front wall 24, a rear wall 26, a left wall 28 and a right wall 30, each of which may be configured to extend vertically. The front wall 24 and the rear wall 26 may extend parallel relative to each other and on opposite sides of the base frame 22. Similarly, the left wall 28 may extend parallel relative to the right wall 30 and along opposite sides of the base frame 22. The front, rear, left and right walls 24, 26, 28, 30 extend to define a space 32 therebetween, which may hold burners 34 and various other structural components, as known to one of ordinary skill in the art. For example, the burners 34, such as flame burners, may extend between the front and rear walls 24, 26. The burners 34 may be coupled to burner control valves 36 or knobs positioned along the front wall 24. In addition, the front wall 24 may also include an ignitor switch 38 that may depressed to provide a spark to, for example, gas fueled burners. The burners 34 of the cooking station 10 may provide heat and be fueled with propane gas or natural gas or any other suitable heating mechanism, such as charcoal or the like. Further, the cooking station 10 may be any suitable cooking station that can effectively support the griddle member 12, as described herein, and further, the cooking station 10 may include the typical components, such as various valves, tubing, frame components, fasteners, for fueling the cooking station 10 arranged and associated with the cooking station 10 to facilitate stability and heating the griddle member 12, as known to one of ordinary skill in the art.

Further, the base frame 22 may include legs 40 some of which may include wheels 42, such as, caster wheels at lower ends of the legs 40 to facilitate portability of the cooking station 10. Further, the base frame 22 may also include a left shelf 44 and a right shelf 46 to assist in providing a flat space to place various items while cooking a food product, such as spices, utensils, plates, and the like, thereby, enhancing the ease of use of the cooking station 10.

Each of the front wall 24, the rear wall 26, the left wall 28 and the right wall 30 (or peripheral side walls) may extend to an upper end 48 of the base frame 22 so as to define an upper rectangular periphery 50 of the base frame 22. The burners 34 may extend between the front and rear walls 24, 26 at a position below the upper end 48 of the base frame 22 and above a lower end 52 of the front and rear walls 24, 26. In one embodiment, the upper end 48 of the peripheral side walls and/or base frame 22 may extend to a ledge 54. Such ledge 54 may extend horizontally with a substantially flat surface 56 to define the upper rectangular periphery 50. In another embodiment, at or adjacent to the upper end 48 of the base frame 22, two oppositely positioned peripheral side walls of the four peripheral side walls may extend horizontally with the flat surface 56, the other two walls not including the flat surface so as to only extend with a more narrow upper end or ledge (for example, the top end of the peripheral side walls). The ledge 54 extending to define the upper rectangular periphery 50 may include holding structure 58. In one embodiment, the holding structure 58 may be in the form of recesses 60 defined in the flat surface 56 of the ledge 54 along or adjacent to the upper end 48 of two oppositely positioned peripheral side walls, such as the left wall 28 and the right wall 30. Such recesses 60 may be sized and configured to receive legs 62 of the griddle member 12. With this arrangement, the griddle member 12 may be positioned and stabilized on the upper side 18 of the base frame 22 of the cooking station 10.

The griddle member 12 may be sized and configured to correspond with the upper rectangular periphery 50 of the cooking station 10. The griddle member 12 may include an upper side 66 and an underside 68 (see FIG. 2A), the underside 68 having the legs 62 extending therefrom and adjacent to an underside periphery 70 of the underside 68. The upper side 66 may include a flat rectangular cooking surface 72 that may be elongated, square, or substantially square. The upper side 66 may include an upstanding wall 74 that may extend at least partially along a periphery 76 of the flat rectangular cooking surface 72, the periphery 76 extending along and defining a front side 78, a rear side 80, a left side 82 and a right side 84. The upstanding wall 74 may extend at least along the rear side 80, the left side 82 and the right side 84 of the periphery 76 of the flat rectangular cooking surface 72 so as to define a rear upstanding wall 86, a left upstanding wall 88, and a right upstanding wall 90, respectively. Such upstanding wall 74 may act as a splash guard for assisting oil and grease from spattering beyond the confines of the upper side 66 of the griddle member 12. In one embodiment, each of the rear, left and right upstanding walls 86, 88, 90 may include a common and constant height 92 extending between a top end 93 or top edge and the periphery 76 (or the underside periphery 70) and extending along their respective lengths along the periphery 76 of the cooking surface 72. In another embodiment, the rear upstanding wall 86 may include a constant first height along the length of the rear upstanding wall 86 and the left and right upstanding walls 88, 90 may taper in height from the first height at least partially along a length of the left and right upstanding walls 88, 90 so as to extend smaller in height toward the front side 78 of the periphery 76 of the cooking surface 72.

In one embodiment, the front side 78 of the rectangular cooking surface 72 may include a trough 94 extending along a length of the front side 78. Such trough 94 may be sized and configured to collect oil from food cooked on the cooking surface 72. In this manner, the trough 94 may extend from the left side 82 to the right side 84 (or alternatively, from the right side 84 to the left side 82) along the front side 78 of the cooking surface 72 to empty into an oil pan 96 or grease pan removably attached to the griddle member 12. In another embodiment, the oil pan 96 may be removably attached to the cooking station 10. In another embodiment, the trough 94 may be located along the rear side 80 of the periphery 76 of the cooking surface 10, similar to that disclosed in commonly assigned U.S. application Ser. No. 15/582,675, the disclosure of which is incorporated herein in its entirety.

The griddle member 12 may be manufactured from metallic materials, such as, carbon steel, cast iron, stainless steel, or aluminum, or various metal alloys, or composite layering of materials, or any other suitable cooking surface material known in the art, such as porcelain coated materials. In one embodiment, the metallic materials for the griddle member 12 may be manufactured using cold rolled steel processes, or hot rolled steel techniques, or any other known manufacturing process, such as casting or stamping, as known in the art. The various plate components of the griddle member 12 may include a thickness of 5-6 millimeters, but is not so limited, as such thickness of the various components of the griddle member 12 may range, for example, between 4-10 millimeters or greater. Also, portions of the griddle member 12, such as the trough 94 and upstanding wall 74 may be formed by employing cutting and bending techniques from sheet or plate material to form the griddle member 12 as well as forming portions, such as the upstanding wall 74 of the griddle member with welding techniques, or employing any other known process or techniques to form the griddle member 12, as known by one of ordinary skill in the art.

Now with reference to FIGS. 3, 4, 4A, and 5, the wind guard members 14, as previously set forth, may be positioned over different portions of the upstanding wall 74 of the griddle member 12 (see also, FIG. 1). For example, the griddle member 12 may be sized to receive four separate and discrete wind guard members 14. In one embodiment, each of the wind guard members 14 may include an elongated structure 98. Such elongated structure 98 may be formed from sheet metal material. The elongated structure 98 may generally exhibit a flat structure. The elongated structure 98 may extend to define a length dimension 102 extending along the elongated longitudinal dimension. Further, the elongated structure 98 may extend with the height dimension 20, the height dimension 20 being lateral or orthogonal to the length dimension 102. The elongated structure 98 may also include a thickness 104 corresponding to the thickness of the sheet metal material.

With reference to FIGS. 1 and 3, in one embodiment, the wind guard members 14 may include multiple sizes. For example, in one embodiment, the wind guard members 14 may include first wind guard members 106 having a first length 108 and second wind guard members 110 having a second length 112, the first length 108 being longer than the second length 112. The wind guard members 14 having the different first and second lengths 108, 112 may include a height common to each other. In one embodiment, the two different lengths for the wind guard members 14 may be employed to accommodate the elongated griddle member 12 as well as the oil pan 96 also positioned over one of the upstanding walls 74 of the griddle member 12. For example, the right upstanding wall 90 may be sized to receive both the oil pan 96 and the wind guard member 14 having the second length 112 and the left upstanding wall 88 may receive the wind guard member 14 having the first length 108. The rear upstanding wall 86 may be sized to receive two wind guard members 14, one having the first length 108 and one having the second length 112 such that the two wind guard members 14 may be positioned adjacent to each other in a side by side manner or abutted end-to-end along the rear upstanding wall 86 of the griddle member 12.

Figure 4:
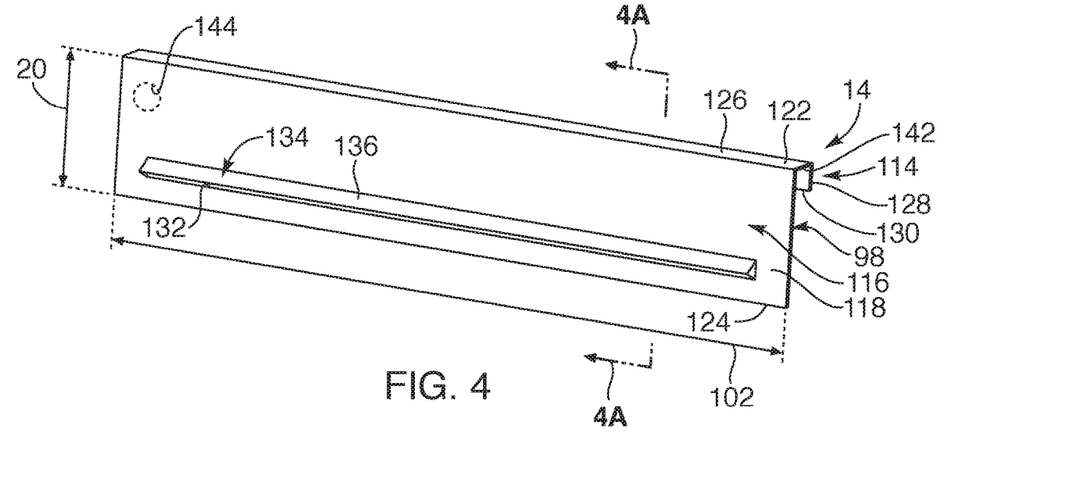
FIG. 4 is a front perspective view of a wind guard member, according to one embodiment of the present invention.
Figure 4A:
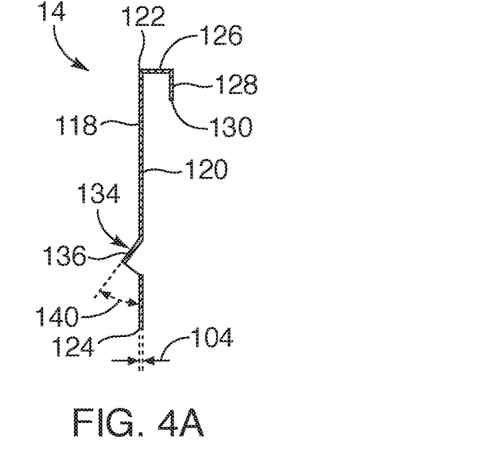
FIG. 4A is a cross-sectional view of the wind guard member taken along section 4A of FIG. 4, according to another embodiment of the present invention.
Figure 5:
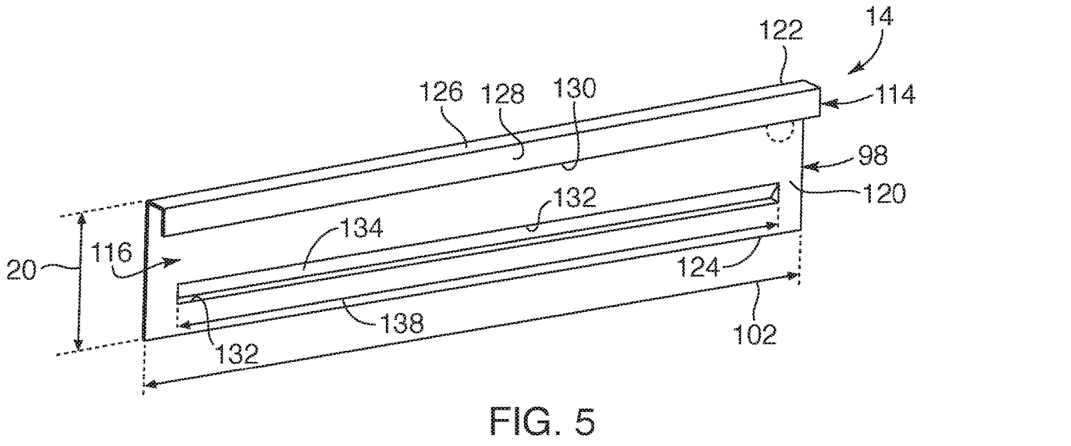
FIG. 5 is a rear perspective view of the wind guard member, according to another embodiment of the present invention.

Now referring to FIGS. 4, 4A, and 5, the elongated structure 98 of each wind guard member 14 may include a hook portion 114 and a shield portion 116, the shield portion 116 including a front face 118 and a rear face 120. Further, the shield portion 116 may extend between an upper end 122 and a bottom end 124 to define the height dimension 20 of the shield portion 116 and the wind guard members 14. The hook portion 114 may extend with a j-shaped configuration at or adjacent to an end or the upper end 122 of the height dimension 20 or shield portion 116. In one embodiment, the hook portion 114 may exhibit a single hook that may at least partially extend rearward from the rear face 120 and along the elongated length 102 at the upper end 122 of the shield portion 116.

In another embodiment, the hook portion 114 may not extend along the entire length 102, but rather, exhibit multiple hooks along the length at the upper end 122 of the shield portion 116. In still another embodiment, the hook portion 114 may be a single hook that extends partially along the length 102 of the shield portion 116 at the upper end 122 thereof. In yet another embodiment, the hook portion 114 may include multiple hooks extending beyond the upper end 122 of the shield portion 116 such that the upper end 122 of the shield portion 116 may be positioned below the top end 93 of the upstanding wall 74 of the griddle member 12 and above the level of the underside 68 of the griddle member 12, the remaining shield portion 116 extending downward to cover the gap 16 defined between the griddle member 12 and the cooking station 10 (see FIG. 2A). In still another embodiment, in the case where the left and right upstanding walls 88, 90 of the griddle member 12 taper, the height of at least two of the wind guard members may also exhibit a corresponding taper such that the height of the shield portion 116 tapers along the length of the shield portion of the wind guard member 14 (see FIG. 2A).

In one embodiment, the hook portion 114 may extend from the upper end 122 of the shield portion 116 with a first part 126 and a second part 128. The first part 126 of the hook portion 114 may extend rearward from the rear face 120 and generally orthogonal relative to the shield portion 116. The second part 128 may then extend downward from one end of the first part 126 to generally extend parallel relative to the shield portion 116 to a free end 130 of the hook portion 114. In this manner, the shield portion 116 with the first part 126 and the second part 128 extending therefrom forms the j-shaped configuration or hook portion 114 at the upper end 122 of the shield portion 116.

In another embodiment, the shield portion 116 may extend generally flat without a radial component along the length 102 of the wind guard member 14. In another embodiment, the shield portion 116 of the wind guard member 14 may include an elongated opening 132 defined therein and sized and configured to facilitate venting heat from within the gap 16 (FIG. 2A). As such, the elongated opening 132 may be positioned on the shield portion 116 so that upon positioning the wind guard member 14 over the griddle member 12 the elongated opening 132 may be positioned along the gap 16 (see FIG. 2B). The shield portion 116 may include vent structure 134 extending over a portion of the elongated opening 132. The vent structure 134 may include a lip 136 extending along a length 138 of the elongated opening 132, the lip 136 extending downward at an angle 140 relative to a plane defined by the shield portion 116. In this manner, the vent structure 134 formed along the elongated opening 132 facilitates releasing heat from the gap 16 (FIG. 2A) such that the downward extending lip 136 moves the heat outward and away from the wind guard members 14 and from the respective exterior sides of griddle member 12. Further, upon positioning the wind guard members 14 over the griddle member as previously depicted in FIGS. 2A and 2B, the shield portion 116 with the downward extending lip 136 exhibited in each wind guard member 14 substantially blocks free flowing wind from entering the gap 16 below the griddle member 12.

In one embodiment, one or more of the wind guard members 14 may define multiple elongated openings therein extending linearly along the length 102 of the shield portion 116 of the wind guard member 14. In another embodiment, the multiple elongated openings defined in the wind guard member 14 may be formed in the shield portion 116 in a stacked manner such that one of the elongated openings may be disposed above another one of the elongated openings. In another embodiment, the multiple elongated openings defined in the wind guard member 14 may be formed within the shield portion 116 such that one of the elongated openings may be positioned adjacent another one of the elongated openings in an end-to-end manner. In another embodiment, the elongated openings may be formed within the shield portion 116 with a combination of being positioned in an end-to-end manner as well as in a stacked manner. In another embodiment, the multiple elongated openings may each exhibit the vent structure 134 with the downward extending lip 136.

With reference to FIGS. 2A, 2B, and 4, as previously set forth, the wind guard members 14 may be sized and configured to be positioned onto the upstanding wall 74 of the griddle member 12 so that the wind guard members 14 cover or block the gap 16 between the griddle member 12 and the cooking station 10. The hook portion 114 of each wind guard member 14 may be readily and manually positioned on and removed from the top end 93 of the upstanding wall 74 of the griddle member 12 such that an underside 142 of the hook portion 114 may be configured to hang or rest on the top end 93 of the upstanding wall 74. As such, the underside 142 of the hook portion 114 may sit and hang on the top end 93 of the upstanding wall 74 so that the height dimension 20 extends downward therefrom to a position below the gap 16 to, thereby, cover the gap 16 defined between the upper side 18 or upper end 48 of the cooking station 10 and the underside 68 of the griddle member 12. In one embodiment, the wind guard members 14 cooperate to cover the gap 16 in a disconnected or non-connected manner relative to each other. In other words, each wind guard member 14 may couple directly to or be suspended by the griddle member 12 such that the wind guard members 14 collectively cover the gap 16 in a separate and discrete manner relative to each other.

In another embodiment, each wind guard member 14 may be a unitary structure. In another embodiment, each wind guard member 14 may be a unitary, seamless monolithic structure. In another embodiment, the wind guard members 14 may each be separate and discrete unitary structures each without fastening structure or any other secondary functional component, such as nuts, bolts, rivets, etc., coupled thereto for fastening or adjusting to a secondary component. Such wind guard members 14 may be formed from sheet metal material, such as steel, or any other suitable sheet material suitable to handle high temperatures. The wind guard members may be formed from sheet metal material by employing stamping processes or the like or a combination of stamping, cutting, bending, pressing, welding processes, and/or powder coating processes.

Now with reference to FIGS. 1, 3, and 4, in another embodiment, the wind guard members 14 may couple directly to the removable griddle member 12, the griddle member 12 being readily removable from the cooking station 10, such that the wind guard members 14 are not directly coupled to any portion of the cooking station 10. In another embodiment, the hook portion 114 at a top end portion of each of the wind guard members 14 may be directly coupled to the top end 93 of the upstanding wall 74 of the griddle member 12 such that each wind guard member 14 exhibits the height dimension 20 that extends downward below a plane, such as a horizontal plane, defined by the cooking surface 72 of the griddle member 12 and continues to extend downward below a plane defined by the underside 68 of the griddle member 12 and further, continues to extend downward below the upper end 122 or base frame 22 on which the griddle member 12 is positioned.

In another embodiment, the length dimension 102 and the height dimension 20 of the shield portion 116 of each wind guard member 14 may be generally linear or generally flat without exhibiting a radial component, but for any vent structure 134 that may be formed therein. In other words, the wind guard members 14 may be coupled adjacently along the periphery 76 of the griddle member 12 along straight or linear portions of the periphery 76, without bends or curves, such that the corresponding structure of the wind guard members 14 extends in a flat linear manner. In another embodiment, the wind guard members 14 may be sized and configured to be positioned on the griddle member 12 such that the shield portion 116 of each wind guard member 14 extends generally perpendicular relative to a plane defined by the cooking surface 72 of the griddle member 12 such that the shield portion 116 extends adjacently alongside the gap 16 and completely exterior of the gap 16 defined between the griddle member 12 and the upper side 18 of the base frame 22 of the cooking station 10.

Figure 6:
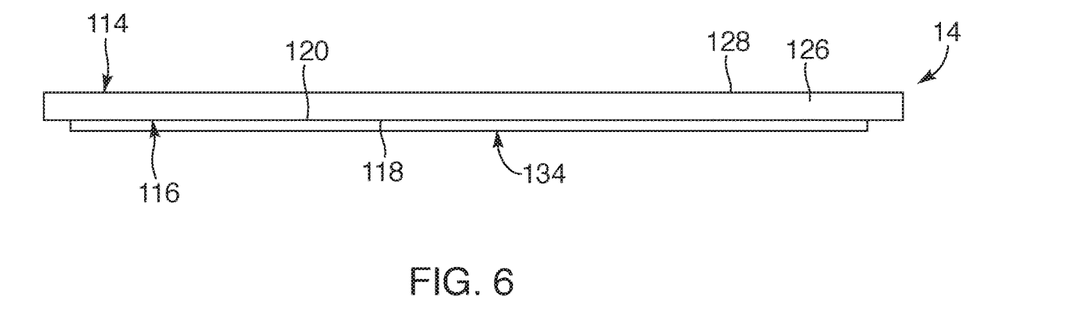
FIG. 6 is a bottom view of the wind guard member, according to another embodiment of the present invention.
Figure 7:
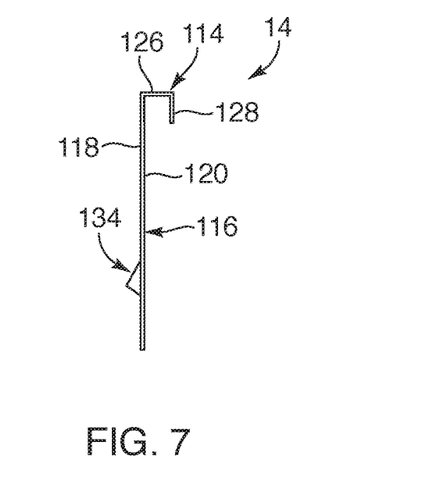
FIG. 7 is a side view of the wind guard member, according to another embodiment of the present invention.
Figure 8:
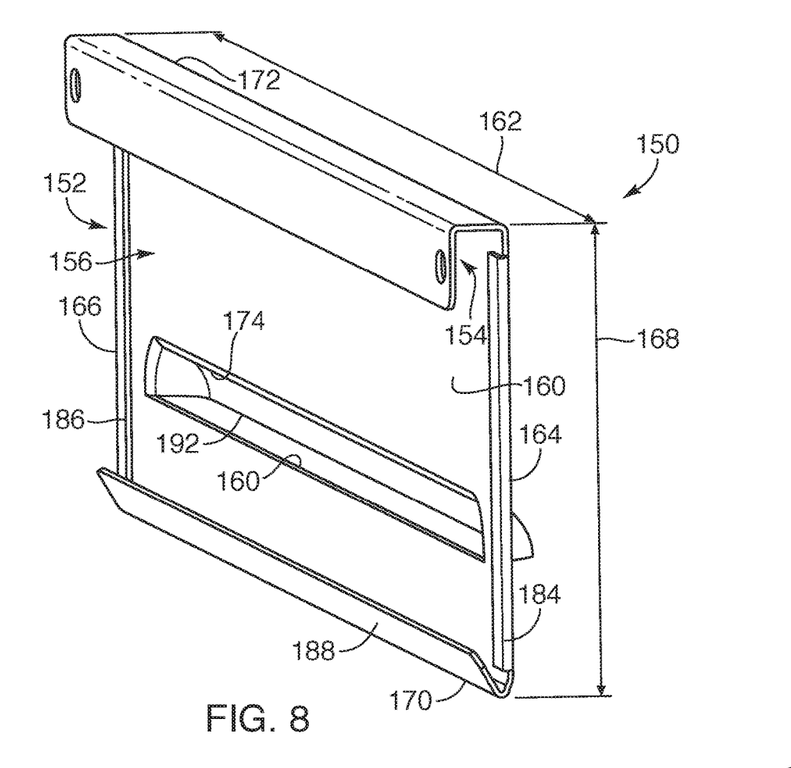
FIG. 8 is a rear perspective view of another embodiment of a wind guard member, according to the present invention.
Figure 9:
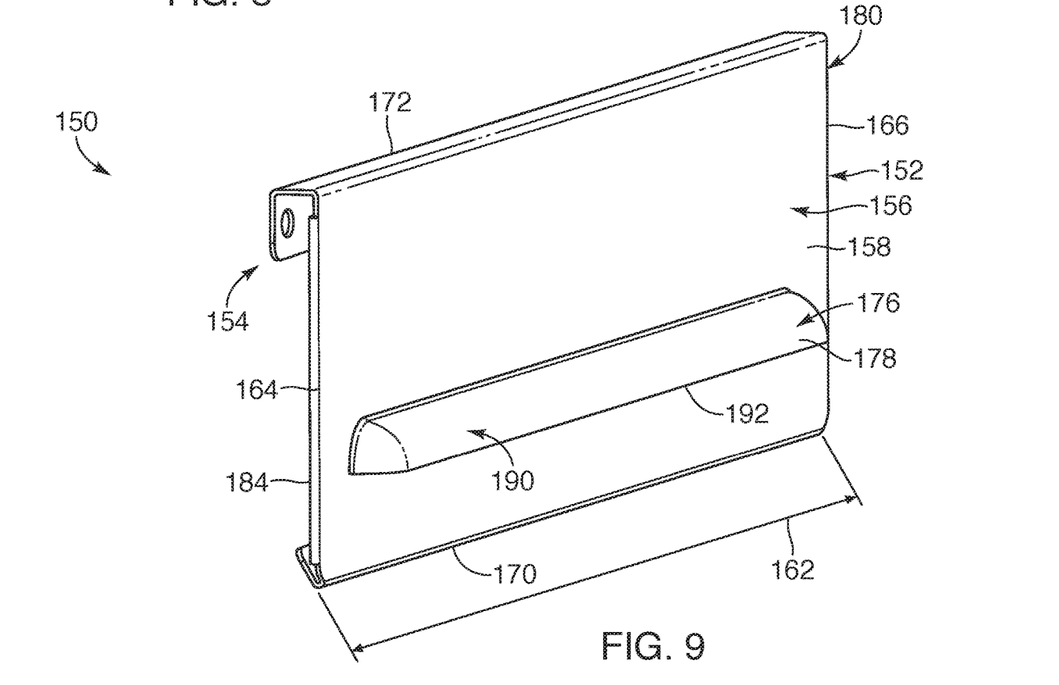
FIG. 9 is a front perspective view of the wind guard member of FIG. 8, according to another embodiment of the present invention.
Figure 10:
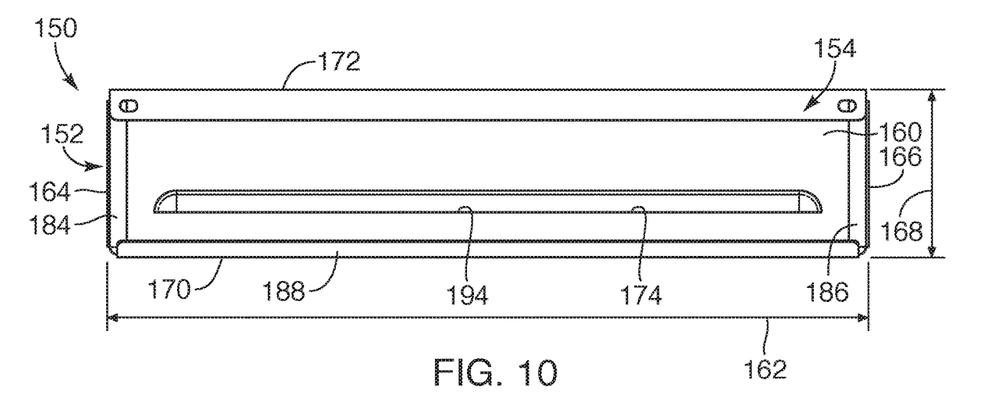
FIG. 10 is a rear view of the wind guard member of FIG. 8, according to another embodiment of the present invention.
Figure 11:
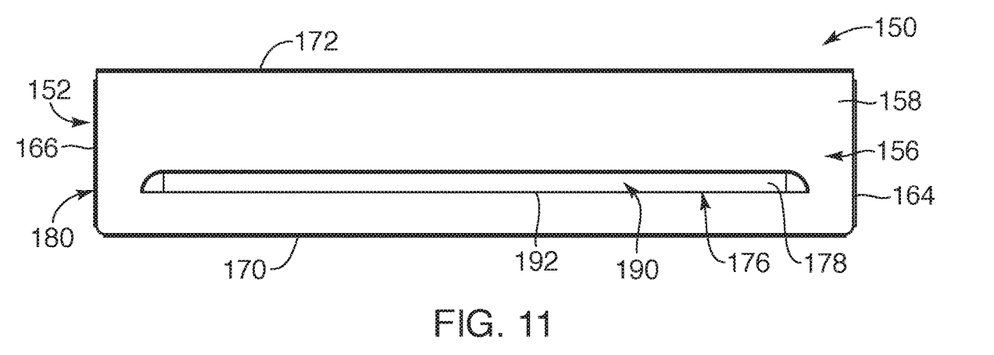
FIG. 11 is a front view of the wind guard member of FIG. 8, according to another embodiment of the present invention.
Figure 12:
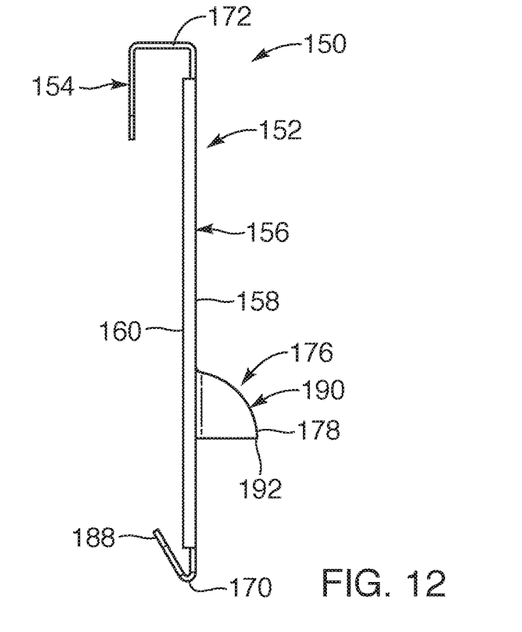
FIG. 12 is a side view of the wind guard member of FIG. 8, according to another embodiment of the present invention.

FIGS. 6 and 7 depict respective bottom and side views of the wind guard member 14. As depicted, the wind guard member 14 exhibits a narrow low profile with the shield portion 116 and the hook portion 114. Further, as previously set forth, the hook portion 114 extends over the rear face 120 of the shield portion 116 and the vent structure 134 extends downward and away from the front face 118 of the shield portion 116. In another embodiment, the first part 126 of the hook portion 114 may radially extend to the second part 128.

With reference to FIGS. 1 and 4, in another embodiment, each of the wind guard members 14 may include a through hole 144 (depicted in outline form) adjacent one end of the shield portion 116 of the wind guard members 14. Such through hole 144 may be employed for hanging the wind guard members 14 from a hook (not shown) or the like coupled to or extending from the base frame 22 or from one of the left shelf 44 and/or the right shelf 46 of the cooking station 10. Further, the through hole 144 may be positioned adjacent the one end of the shield portion 116 such that the through hole 144 corresponds with the level of the griddle member 12 (not corresponding with the gap 16) upon the wind guard members 14 being positioned to hang over the side of the griddle member 12. With this arrangement, the wind guard members 14 can be readily removed from the griddle member 12 and hung with the cooking station 10 for ready access and future use.

Now with reference to FIGS. 8 through 12, another embodiment of a wind guard member 150 is provided. Similar to the previous embodiments, the wind guard member 150 of this embodiment may be employed to block the gap 16 between the griddle member 12 and the upper side 18 of the cooking station 10 with multiple positioned wind guard members 150 positioned along a portion of the upstanding wall 74 of the griddle member 12 (see FIGS. 2A and 2B). The wind guard member 150 may include similar structural and functional features to that described in previous embodiments and may be formed by employing similar techniques described herein. For example, the wind guard member 150 may extend with an elongated flat structure 152 extending to define a hook portion 154 and a shield portion 156, the hook portion 154 extending along an upper portion or end of the elongated flat structure 152 and the shield portion 156 extending to define a front face 158 and a rear face 160. The shield portion 156 may extend along a length 162 between a first end 164 and a second end 166 and may extend with a height 168 between a bottom end 170 and a top end 172. Further, the shield portion 156 may define an elongated opening 174 with vent structure 176 to exhibit a lip 178 extending downward and outward from the front face 158 and over a portion of the elongated opening 174.

In this embodiment, the shield portion 156 of the wind guard member 150 may extend with a periphery 180 defining each of the first and second ends 164, 166 and the bottom and top ends 170, 172 such that portions of the periphery 180 may extend with one or more bends so as to exhibit folded portions or bent portions extending over and along portions of the rear face 160 of the shield portion 156. For example, as previously set forth, the wind guard member 150 may include the hook portion 154 that may extend, in one embodiment, along the length of the top end 172. Such hook portion 154 may be similar to that described in previous embodiments. Further, the first and second ends 164, 166, along the height 168 thereof, of the wind guard member 150 may extend with first and second folded portions 184, 186 that may wrap around and over the rear face 160 of the wind guard member 150 so as to extend generally parallel with the rear face 160. Also, along the bottom end 170 of the wind guard member 150, the bottom end 170 may define a bottom extension 188 or folded portion that may extend upward from the bottom end 170 and away from the rear face 160 along the length of the wind guard member 150 so as to extend at an angle relative to the rear face 160 of the shield portion 156. Such folded portions along the periphery 180 of the wind guard member 150 may facilitate greater stability along the side or length over which the folded portions extend and, further, to the overall stability of the wind guard member 150. Further, the bottom extension 188 may provide strength and stability to the wind guard member 150 so as to prevent warping of the wind guard member 150 upon being exposed to high temperatures. Further, the first and second folded portions 184, 186 and the bottom extension 188 may also provide and structurally facilitate an atraumatic surface along edges of the wind guard member 150 so as to substantially eliminate sharp edges along the periphery 180 of the wind guard member 150. It should be noted that the wind guard members 150 of this embodiment may come with multiple lengths and with a substantially common height, similar to that described in previous embodiments of the wind guard member 150.

Further, in this embodiment, the lip 178 of the vent structure 176 may extend downward over the elongated opening 174 with an arcuate structure 190. The lip 178 may extend to a lip end 192 that may extend level with a bottom edge 194 of the elongated opening 174 so that wind may be substantially blocked by the lip 178 of the vent structure 176 while also allowing hot air to billow outward and downward under and past the arcuate structure 190 of the vent structure 176. Further, the vent structure 176 (similar to the bottom extension 188) may act to substantially prevent the wind guard member 150 from warping upon being exposed to high temperatures. As in previous embodiments, the vent structure 176 may extend with a single linearly extending vent along the length of the wind guard member 150 and a long a lower portion of the shield portion 156 so that the vent structure 176 of the wind guard member 150 may be sized and configured to be aligned with the gap 16 below the griddle member 12. In another embodiment, the vent structure 176 may extend with multiple spaced apart and linearly aligned vents so as to be positioned and aligned with the gap 16 below the griddle member 12 (see FIGS. 2A and 2B).

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A wind guard system for use with an outdoor type griddle cooking station having an upper side with burners positioned therein, comprising:
    a griddle member including an upper side and an underside, the upper side including a flat rectangular cooking surface and an upstanding wall extending along a periphery of the flat rectangular cooking surface, the upstanding wall extending at least along a rear side, a right side and a left side of the periphery of the flat rectangular cooking surface, the underside of the griddle member including legs adjacent to an underside periphery of the underside of the griddle member, the legs sized and configured to be positioned on the upper side of the cooking station so as to define a gap between the underside of the griddle member and the upper side of the cooking station; and
    multiple wind guard members separate and discrete from each other, each of the multiple wind guard members extending with an elongated length, a height, and a thickness, the thickness being a sheet metal material, each of the multiple wind guard members including an upper end portion exhibiting a hook portion, the hook portion of each of the multiple wind guard members sized and configured to be positioned to removably hang over a top edge of the upstanding wall of the griddle member so that each of the multiple wind guard members extends downward to cover the gap between the underside of the griddle member and the upper side of the cooking station to at least partially prevent wind from moving through the gap.

2. The wind guard system of claim 1, wherein each of the multiple wind guard members comprises an elongated hole defined therein, the elongated hole extending along the elongated length of each of the multiple wind guard members, the elongated hole exhibiting a vent structure extending over the elongated hole.

3. The wind guard system of claim 1, wherein the hook portion of each of the wind guard members extends along the elongated length of the upper end portion of each of the wind guard members.

4. The wind guard system of claim 1, wherein each of the multiple wind guard members comprises two wind guard members with a first length and two wind guard members with a second length, the height of each of the wind guard members with the first length and the second length being a common height.

5. A method for substantially blocking wind between a gap of a griddle cooking station, the method comprising:
providing a cooking station including a base frame having a front wall, a rear wall, a left wall and a right wall each extending to an upper end of the base frame so as to define an upper rectangular periphery of the base frame, the cooking station including flame burners positioned between the front wall and the rear wall, the cooking station including a griddle member sized to correspond with the upper rectangular periphery of the base frame, the griddle member including an upper side and an underside, the upper side including a flat rectangular cooking surface and an upstanding wall extending along a periphery of the flat rectangular cooking surface, the upstanding wall extending at least along a rear side, a right side and a left side of the periphery of the flat rectangular cooking surface, the underside of the griddle member including legs adjacent to an underside periphery of the underside of the griddle member, the legs sized and configured to be positioned on the base frame so as to define a gap between the underside of the griddle member and the upper end of the base frame; and
positioning multiple separate and discrete wind guard members with a hook portion such that hook portion of each of the wind guard members sits over a top edge of the upstanding wall of the griddle member so that the wind guard members extend downward to cover the gap between the underside of the griddle member and the upper end of the base frame to at least partially prevent wind from moving through the gap.

6. The method according to claim 5, wherein the positioning comprises hanging the wind guard members over the top edge of the upstanding wall of the griddle member.

7. The method according to claim 5, wherein the positioning comprises positioning the wind guard members over the top edge of the upstanding wall of the griddle member such that an elongated hole defined in each of the wind guard members extends longitudinally along an elongated length of the wind guard members and extends to correspond with the gap defined between the griddle member and the base frame.

8. The method according to claim 5, wherein the positioning comprises positioning two wind guard members with a first longitudinal length and positioning two wind guard members with a second longitudinal length such that a height of each of the wind guard members with the first and second longitudinal lengths is a common height.

9. The method according to claim 5, wherein the positioning comprises positioning wind guard members separately and discretely over the top edge of the upstanding wall of the griddle member such that the wind guard members are positioned in a disconnected manner relative to each other.

10. A wind guard system for blocking a cross-wind while cooking a food product, the wind guard system comprising:
a cooking station including a base frame having a front wall, a rear wall, a left wall and a right wall each extending to an upper end of the base frame so as to define an upper rectangular periphery of the base frame, the cooking station including flame burners positioned between the front wall and the rear wall;
a griddle member sized to correspond with the upper rectangular periphery of the base frame, the griddle member including an upper side and an underside, the upper side including a flat rectangular cooking surface and an upstanding wall extending along a periphery of the flat rectangular cooking surface, the upstanding wall extending at least along a rear side, a right side and a left side of the periphery of the flat rectangular cooking surface, the underside of the griddle member including legs adjacent to an underside periphery of the underside of the griddle member, the legs sized and configured to be positioned on the base frame so as to define a gap between the underside of the griddle member and the upper end of the base frame; and
multiple wind guard members separate and discrete from each other, each of the multiple wind guard members extending with an elongated length, a height, and a thickness, the thickness being a sheet metal material, each of the multiple wind guard members including an upper end portion exhibiting a hook portion, the hook portion of each of the multiple wind guard members sized and configured to be positioned to removably hang over a top edge of the upstanding wall of the griddle member so that each of the multiple wind guard members extends downward to cover the gap between the underside of the griddle member and the upper side of the cooking station to at least partially prevent wind from moving through the gap.

11. The wind guard system of claim 10, wherein each of the multiple wind guard members comprises an elongated hole defined therein, the elongated hole extending along the elongated length of each of the multiple wind guard members, the elongated hole exhibiting a vent structure extending over the elongated hole.

12. The wind guard system of claim 10, wherein the hook portion of each of the wind guard members extends along the elongated length of the upper end portion of each of the wind guard members.

13. The wind guard system of claim 10, wherein each of the multiple wind guard members comprises two wind guard members with a first length and two wind guard members with a second length, the height of each of the wind guard members with the first length and the second length being a common height.

14. A wind guard system for blocking a cross-wind while cooking a food product on a griddle member positioned on a cooking station such that a gap is defined between an upper side of the cooking station and an underside of the griddle member, the wind guard system comprising:

multiple wind guard members separate and discrete from each other, each of the multiple wind guard members including:

an elongated flat structure extending with an elongated length, a height, and a thickness, the thickness being a sheet metal material, the elongated flat structure including an upper end portion exhibiting a hook portion, the hook portion sized and configured to be positioned to removably hang over a top edge of the griddle member so that the height of the elongated structure extends downward to cover a gap between an underside of the griddle member and the upper side of the cooking station to at least partially prevent wind from moving through the gap.

15. The wind guard system of claim 14, wherein the elongated flat structure comprises an elongated hole defined therein, the elongated hole extending along the elongated length of each of the multiple wind guard members, the elongated hole exhibiting a vent structure extending over the elongated hole.

16. The wind guard system of claim 14, wherein the hook portion of the elongated structure extends along the elongated length of the upper end portion of each of the wind guard members.

17. The wind guard system of claim 14, wherein the hook portion comprises a j-shape configuration.

18. The wind guard system of claim 14, wherein the elongated flat structure extends to define a bottom end with a bottom extension extending upward from the bottom end along a length of the elongated flat structure.

19. The wind guard system of claim 14, wherein the elongated flat structure extends between a first end and a second end, the first and second ends including a folded portion.

20. The wind guard system of claim 14, wherein each wind guard member comprises a single-piece seamless monolithic structure.

* * * * *